A. C. HANSON.
HORSESHOEING IMPLEMENT.
APPLICATION FILED APR. 12, 1915.
1,177,409.
Patented Mar. 28, 1916.
4 SHEETS—SHEET 1.
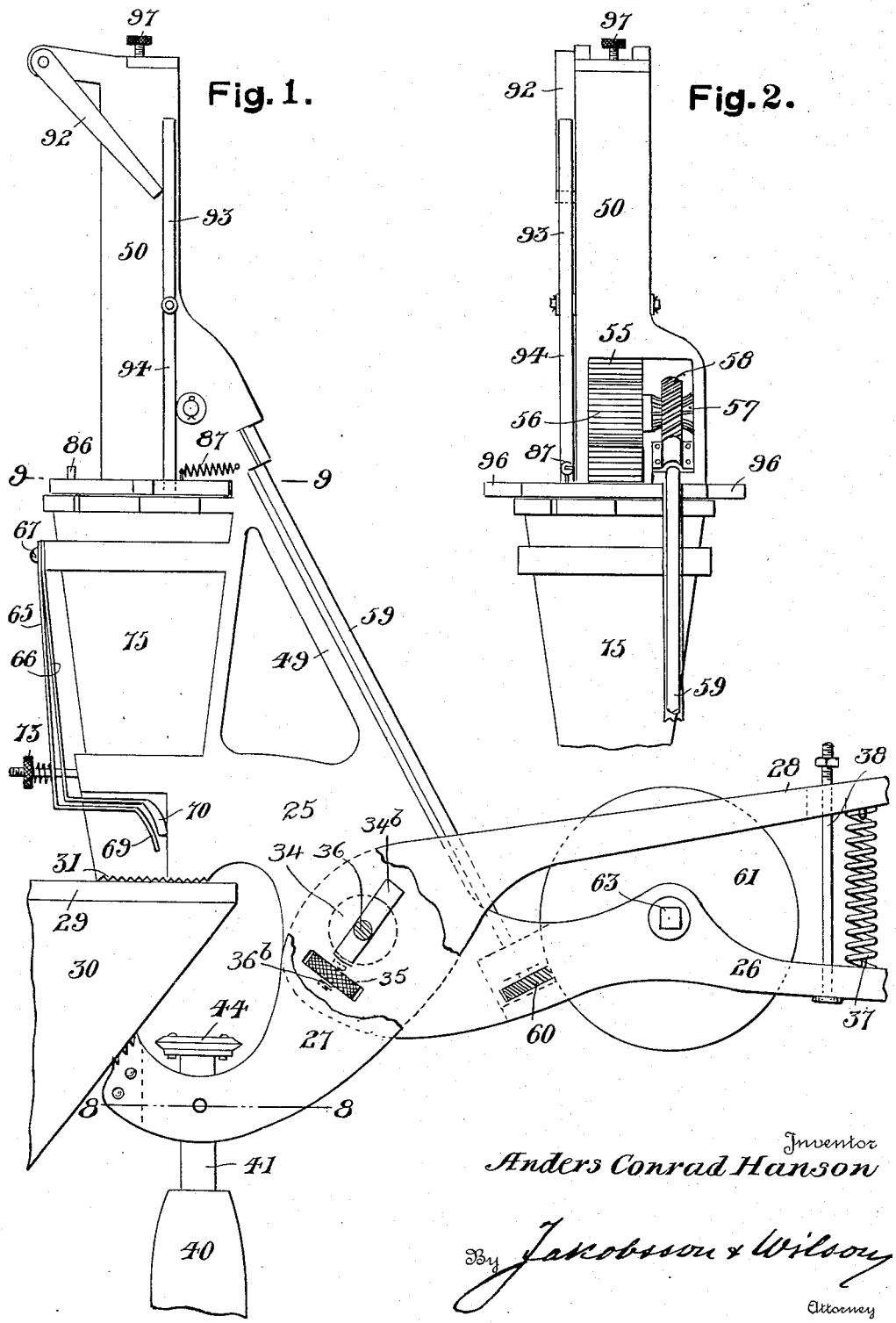
Inventor
Anders Conrad Hanson
By Jakobsson & Wilson
Attorney

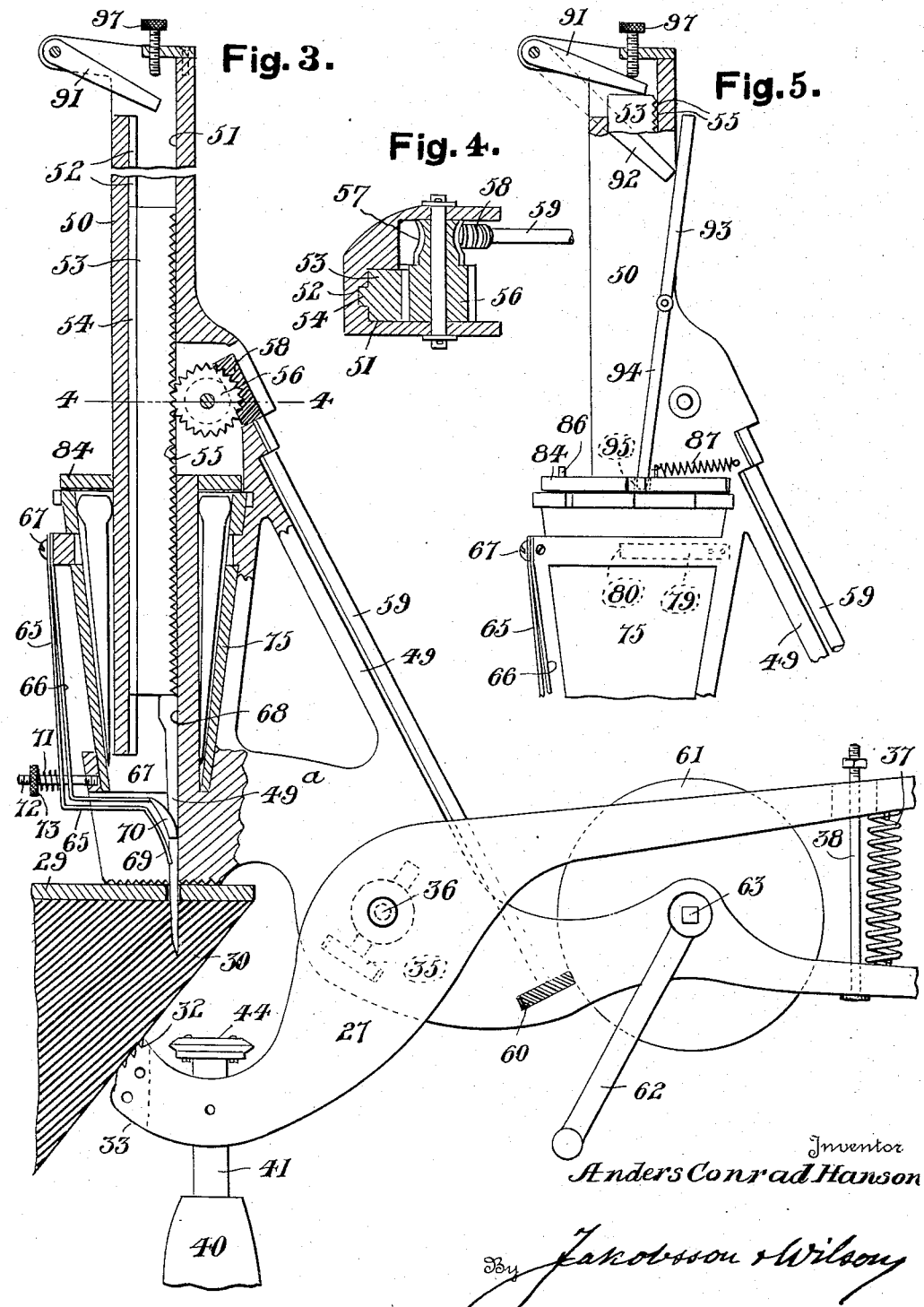

A. C. HANSON.
HORSESHOEING IMPLEMENT.
APPLICATION FILED APR. 12, 1915.
1,177,409.
Patented Mar. 28, 1916.
4 SHEETS—SHEET 3.
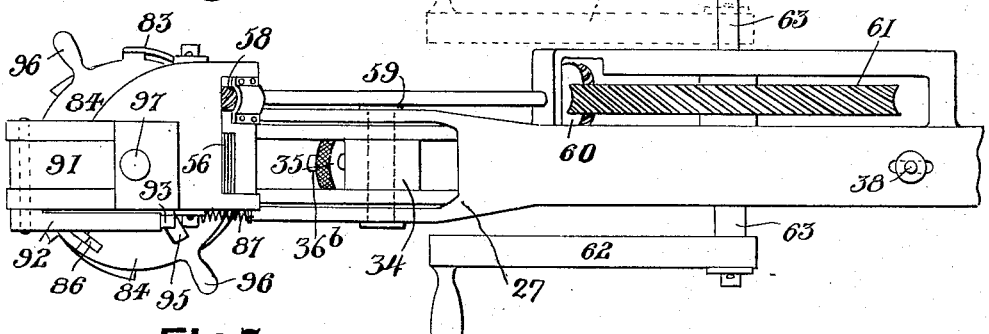
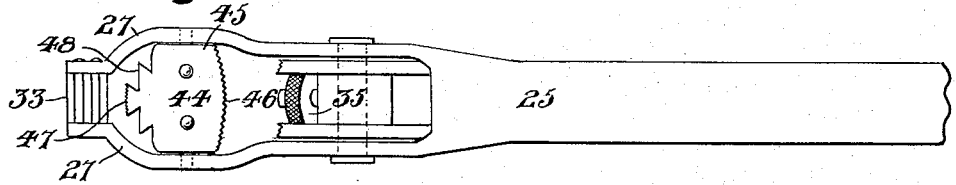
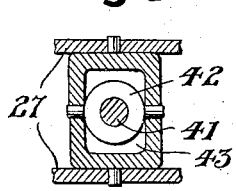
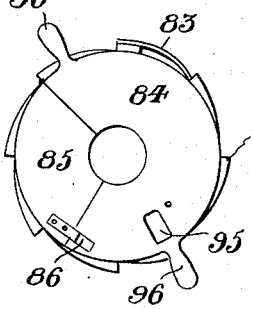
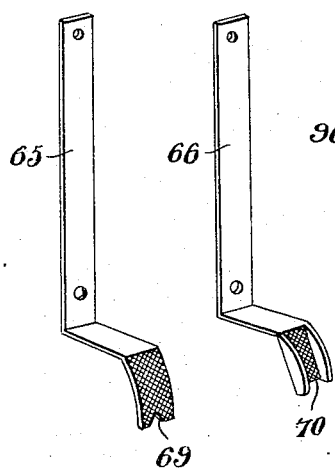
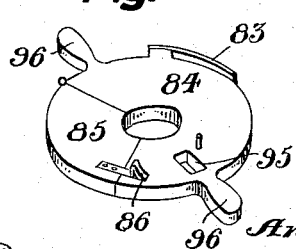
Inventor
Anders Conrad Hanson
By Jacobsson & Wilson
Attorney

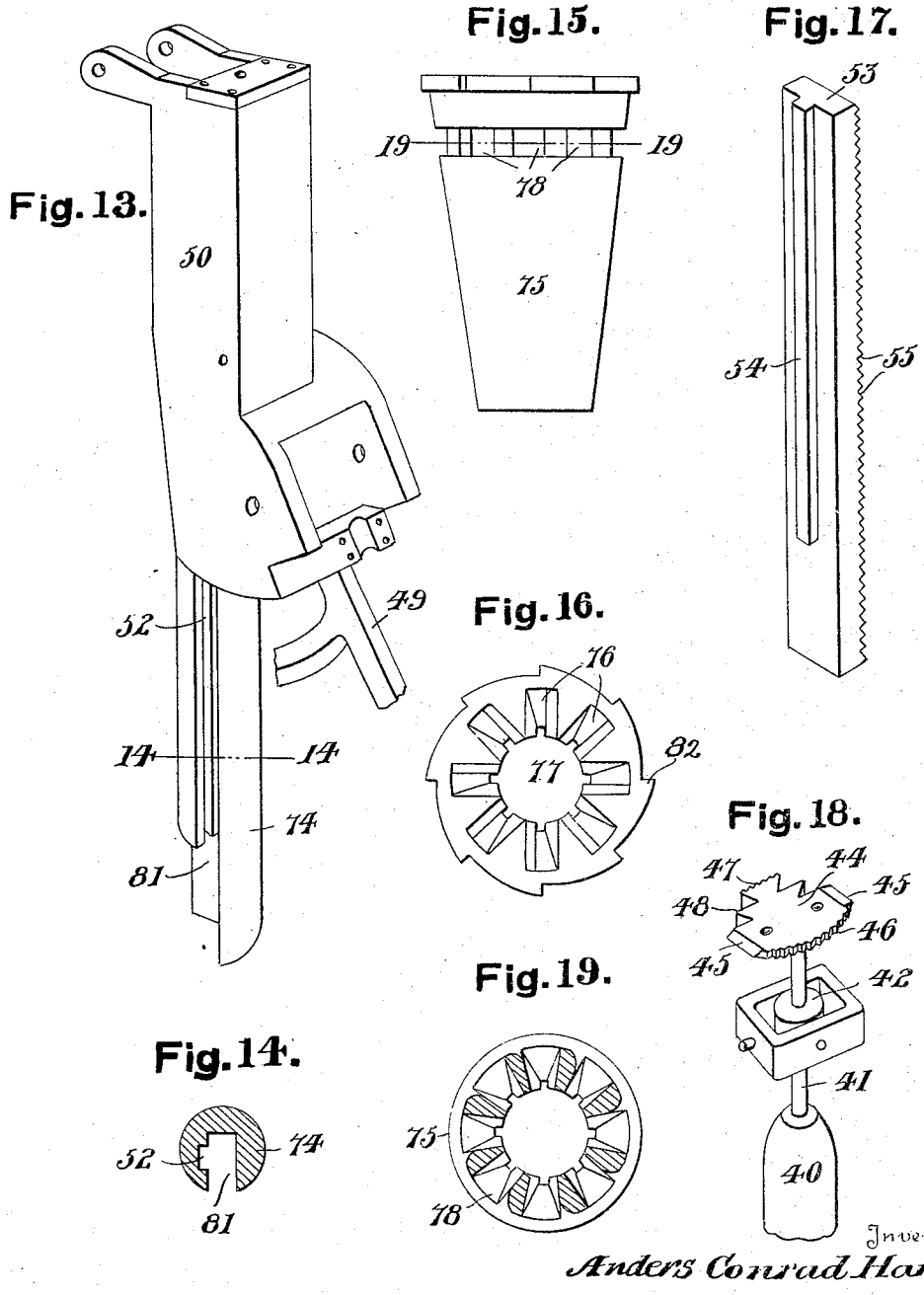

UNITED STATES PATENT OFFICE.

ANDERS CONRAD HANSON, OF STANTON, IOWA.

HORSESHOEING IMPLEMENT.

1,177,409.

Specification of Letters Patent.

Patented Mar. 28, 1916.

Application filed April 12, 1915. Serial No. 20,723.

*To all whom it may concern:*

Be it known that I, ANDERS CONRAD HANSON, a citizen of Sweden, residing at Stanton, in the county of Montgomery and State of Iowa, have invented certain new and useful Improvements in Horseshoeing Implements, of which the following is a specification.

The present invention relates to a horseshoeing implement constituting a combination between a pair of farrier tongs and a nail driving device.

The advantages possessed by this implement are many as will be readily understood, as it does not only grip and hold the hoof and the shoe securely during the operation, but drives or presses the nail in easily and without the use of a hammer, which is always apt to frighten the horse and might cause injury to the animal.

Some other objects and advantages of the present invention are as follows:—The implement may be used for different sizes of nails which are automatically fed into position. Hand feeding may also be used. The nails are held so they cannot be bent during the pressing in operation. The nail may be directed to take a deep or shallow bite. The jaws of the implement are adjustable relatively to each other.

In the accompanying drawings, one embodiment of my invention has been illustrated.

Figure 1 is a side elevation of the implement assembled and in position for use. Fig. 2 is a part front elevation of Fig. 1. Fig. 3 is an elevation similar to Fig. 1, partly in section. Fig. 4 is a cross-section on line 4—4 of Fig. 3. Fig. 5 is a side elevation similar to Fig. 1, but with parts in different position. Fig. 6 is a top plan view of Fig. 1. Fig. 7 is a partial plan view seen from above of Fig. 3, showing the adjustable bearing. Fig. 8 is a cross-section on line 8—8 of Fig. 1. Fig. 9 is a cross-section on line 9—9 of Fig. 1. Fig. 10 is a perspective view of the lid. Figs. 11 and 12 are perspective views of some of the springs. Fig. 13 is a perspective view of the nail drum. Fig. 14 is a cross-section on line 14—14 of Fig. 13. Fig. 15 is the nail magazine in elevation. Fig. 16 is a top plan view of Fig. 15. Fig. 17 is a perspective view of the plunger. Fig. 18 is a perspective view of the trimmer, and, Fig. 19 is a section on line 19—19 of Fig. 15.

The tongs have the usual two jaws, namely, an upper one 25 with its shank 26 and a lower jaw 27 with its shank 28. In order to get a firm hold on the shoe 29 and the hoof 30, the jaws are provided with gripping teeth 31, 32, which may be cut in the jaws themselves or preferably in a hard steel piece 33, which is then riveted to the jaws. The two jaws are hinged by means of a pin 36, which is securely fastened in the lower jaw 27, but its bearing piece 34 is slidable in a guide-way $34^b$ in the upper jaw 25 so that, by turning the knurled nut 35 and the threaded bearing shank $36^b$ the two jaws may be slightly displaced with respect to each other in order to make the gap wider or narrower to suit different sizes of hoofs and still preserve the relative angular position of the gripping surfaces. A compression spring 37 is provided between the shanks 26, 28 for the purpose of opening the jaws when released, and a stop screw 38 with nut for limiting the movement of the shanks.

The cutting and scraping tool 40, best seen in Figs. 7, 8 and 18, with a suitable handle, has a cylindrical neck 41 slidably carried in a universal bearing comprising two bearing members 42 and 43 having their axes of oscillation intersecting at right angles, the outer member 43 being mounted to oscillate between the two sides of the lower jaw 27. It will thus be seen that the tool 40 may not only be turned around its own axis and slid up and down but may also be given a limited oscillating movement in the jaw 27. On the head of the tool is rigidly secured a knife 44 provided with two sharp cutting edges 45, a circular filing side 46, a flat one 47, as well as several deep notches forming sharp points 48. With this tool may consequently, not only the hoof be scraped and trimmed before the shoe is applied, but also the nail $49^a$ be cut off at the desired length, the latter operation being accomplished by either turning the tool, using the circular file portion 46, or by rocking it sidewise, in the latter case, applying the flat file portion 47. During the actual nailing process, the tool 40 hangs straight down and will therefore be out of the way for the penetrating nail $49^a$, which will reach down between the two sides of the lower jaw 27, just behind the steel piece 33 and in front of the knife 44.

On top of the upper jaw is constructed a frame 49 or housing for securely supporting the nail drum 50 as well as the necessary gearing for pressing the nail through the hoof. This drum has an axial passage or guide-way 51 with a key-way 52 for the plunger 53 having a corresponding feather 54 and rack teeth 55. A pinion 56 meshes with the teeth 55 and is journaled on pin in the frame 49. Integral with the pinion 56 is a worm wheel 57 which is driven by the worm 58 on a shaft 59, which is also mounted in the frame 49 and carries a spiral pinion 60 at its other end. This spiral pinion 60 is actuated by the spiral wheel 61 see Figs. 3 and 6, which may be turned by the crank handle 62 secured on the same spindle 63 as the wheel 61, which is revolubly mounted in the shank of the upper jaw 25. In order to make the implement left-handed as well as right-handed, the handle may be shifted from one end of the spindle 63 to the other and secured thereon in the usual manner by a nut.

Two springs 65, 66 (see Figs. 3 and 12) are secured in the frame 49 by screws 67 so as to press in the direction of the opposite wall 68 of the guideway and thus hold a descending nail 67 pressed against the wall 68 and prevent its bending. The outer or longer spring 65 is provided with a small notch 69 and the other spring 66 with side flanges 70, all for the purpose of guiding the nail and retaining it in upright position while being pushed down.

An auxiliary spring 71 mounted around a screw 72 secured in the frame 49 and having a nut 73 is provided for adjusting the pressure of the spring 65. The lower portion 74 of the drum 50 see Fig. 13, the outer surface of which is cylindrical, serves as a shaft for the nail magazine 75 around which it may be revolved, see Figs. 3, 13, 14, 15, 16, 17. This magazine is built in the shape of an inverted conic frustum and is provided with a plurality of open nail pockets 76, usually eight in number, or the same as is required for one shoe. These pockets are slanting inward and open into the cylindrical bore 77 of the magazine. From each pocket runs a radial passage 78 to its outer surface and a spring 79, Fig. 11, with a knuckle shaped end 80 engages with one of the passages at the time to hold the magazine in correct position when the nail is being pushed down and constructed to enter the pocket deep enough to push the nail contained therein out of the pocket and into the axial guide-way 51 in the drum 50. This spring is secured in a suitable manner on the frame 49. It will thus be seen that every time the magazine 75 is revolved one step forward, this spring 79 will push the nail out of the pocket which at the time registers with the open side 81 of the guideway and into the same.

The magazine has a number of ratchet teeth 82 one for each pocket, formed on the collar at its upper or wider end, which are intended to register with a pawl spring 83 fastened on an oscillating lid 84 mounted around the cylindrical portion 74 of the drum and directly above the magazine 75. This lid has a hinged cover portion 85 with a suitable snap latch 86 to hold it in position, and this portion is made to swing out to uncover some of the pockets in the magazine when it is to be charged with nails. A returning spring 87, permitting only a limited revolution of the lid 84, connects it with the frame 49, every time the lid has been turned to revolve the magazine.

At the top of the drum is provided a rocking member 90 with two fingers 91 and 92, the shorter one of which 91 projects into the guide-way 51, intersecting the path of the plunger 53, when the same is lifted by turning the handle 62 backward. The longer finger 92 being thus raised together with the shorter one, engages with the upper end 93 of a rocking lever, the lower end 94 of which registers with an aperture 95 in the lid 84, which is thus pushed forward one step, at the same time turning the magazine the same amount. Directly the plunger 53 is reversed, the lid returns however to its former position actuated by spring 87, leaving the magazine behind held by spring 79. If it should be desired to feed the magazine forward by hand, for instance, when filling it, this may be done by means of the handles 96 shown thereon. A stop screw 97 for limiting the upward movement of the plunger 53 is shown at the top of the drum.

The operation of the implement is now obvious. With the plunger 53 in its uppermost position, when a nail has just been delivered into the guide-way 51 and held upright by the two springs 65, 66 against the side 68 of the guide-way 51 and with its head just below the lower end of the plunger, the latter will be lowered by turning the handle 62 forward, pushing the nail before it through the horse's hoof until the plunger stops against the horseshoe. The end of the nail will thereupon be cut off by the knife 44 as already described, and given the necessary finish. The tongs may now be shifted into position for driving in the next nail, when the magazine will again deliver a new nail by means of a reverse turn of the handle 62, and the nail driven in as before.

What I claim is:—

1. In a horse-shoeing implement, a pair of tongs comprising an upper and a lower jaw having gripping teeth, a housing on one of said jaws, a plunger in said housing, means for reciprocating said plunger for driving a nail into the hoof, said means acting independently of the gripping action of the jaws and comprising gear teeth on said plunger, a pinion meshing with said gear teeth, a crank handle on said upper jaw, and suitable connections between said crank handle and said pinion for turning the latter and reciprocating said plunger.

2. In a horse-shoeing implement, a pair of tongs comprising an upper and a lower jaw having gripping teeth, a housing on one of said jaws, a plunger in said housing, a nail feeding device for supplying a nail at a time in front of said plunger, means for reciprocating said plunger for driving a nail into the hoof, said feeding device comprising a revoluble magazine having a plurality of inwardly open pockets for nails, a two-armed rocking lever on the housing engaging with one arm said magazine, and an intermediary oscillating member actuated by said plunger and abutting against the other arm of said lever for rocking it, thereby turning the magazine.

3. In a horse-shoeing implement, a pair of tongs comprising an upper and a lower jaw having gripping teeth, a housing on one of said jaws, a plunger in said housing, a nail feeding device for supplying a nail at a time in front of said plunger, means for reciprocating said plunger for driving a nail into the hoof, said feeding device comprising a revoluble magazine having a plurality of inwardly open pockets for nails, a lid on said magazine, pawl and ratchet members on said lid and magazine, a spring permitting partial rotation of said lid, a two-armed rocking lever on the housing engaging with one arm the lid of said magazine, and an intermediary oscillating member actuated by said plunger and abutting against the other arm of said lever for rocking it.

4. In a horse-shoeing implement, a pair of tongs comprising an upper and a lower jaw having gripping teeth, a housing on one of said jaws, a plunger in said housing, a nail feeding device for supplying a nail at a time in front of said plunger, means for reciprocating said plunger for driving a nail into the hoof, said feeding device comprising a revoluble magazine having a plurality of inwardly open pockets for nails, a lid on said magazine, pawl and ratchet members on said lid and magazine, a spring permitting partial rotation of said lid, a two-armed rocking lever on the housing engaging with one arm the lid of said magazine, and an intermediary oscillating member actuated by said plunger and abutting against the other arm of said lever for rocking it, and means for pushing a nail out of one of said pockets into the path of said plunger.

5. In a horse-shoeing implement, a pair of tongs comprising an upper and a lower jaw having gripping teeth, a housing on one of said jaws, a plunger in said housing, a nail feeding device for supplying a nail at a time in front of said plunger, means for reciprocating said plunger for driving a nail into the hoof, said feeding device comprising a revoluble magazine having a plurality of inwardly open pockets for nails, a lid on said magazine, pawl and ratchet members on said lid and magazine, a spring permitting partial rotation of said lid, a two-armed rocking lever on the housing engaging with one arm the lid of said magazine, and an intermediary oscillating member actuated by said plunger and abutting against the other arm of said lever for rocking it, means for pushing a nail out of one of said pockets into the path of said plunger, and a pair of grippers for holding the nail in upright position in said path.

6. In a horse-shoeing implement, a pair of tongs comprising an upper and a lower jaw having gripping teeth, a housing on one of said jaws, a plunger in said housing, a nail feeding device for supplying a nail at a time in front of said plunger, means for reciprocating said plunger for driving a nail into the hoof, said feeding device comprising a revoluble magazine having a plurality of inwardly open pockets for nails, a two-armed rocking lever on the housing engaging with one arm said magazine, and an intermediary oscillating member actuated by said plunger and abutting against the other arm of said lever for rocking it, and a spring engaging with said magazine to retain it selectively in a plurality of predetermined positions.

7. In a horse-shoeing implement, a pair of tongs comprising an upper and a lower jaw having gripping teeth, a housing on one of said jaws, a plunger in said housing, a nail feeding device for supplying a nail at a time in front of said plunger, means for reciprocating said plunger for driving a nail into the hoof, said feeding device comprising a revoluble magazine having a plurality of inwardly open pockets for nails, a two-armed rocking lever on the housing engaging with one arm said magazine, and an intermediary oscillating member actuated by said plunger and abutting against the other arm of said lever for rocking it, and a spring engaging with said magazine to retain it selectively in a plurality of predetermined positions, said spring being provided with a finger constructed to enter a pocket and pushing a nail out of it and into the path of said plunger.

In testimony whereof I affix my signature in presence of two witnesses.

ANDERS CONRAD HANSON.

Witnesses:
  ED. ERICSON,
  A. ADOLPHSON.